(12) United States Patent
Becker et al.

(10) Patent No.: US 10,071,854 B2
(45) Date of Patent: Sep. 11, 2018

(54) STEEP-ANGLE CONVEYING INSTALLATION FOR OPEN-CAST MINING

(71) Applicant: THYSSENKRUPP INDUSTRIAL SOLUTIONS AG, Essen (DE)

(72) Inventors: Hans-Jürgen Becker, Quierschied (DE); Klaus Werre, St. Ingbert (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 171 days.

(21) Appl. No.: 14/896,627

(22) PCT Filed: May 22, 2014

(86) PCT No.: PCT/EP2014/001385
§ 371 (c)(1),
(2) Date: Dec. 7, 2015

(87) PCT Pub. No.: WO2014/194988
PCT Pub. Date: Dec. 11, 2014

(65) Prior Publication Data
US 2016/0130079 A1    May 12, 2016

(30) Foreign Application Priority Data
Jun. 7, 2013  (DE) ......................... 10 2013 105 937

(51) Int. Cl.
*B65D 88/54* (2006.01)
*B66B 17/26* (2006.01)
(Continued)

(52) U.S. Cl.
CPC ............. *B65D 88/54* (2013.01); *B65G 67/24* (2013.01); *B66B 9/06* (2013.01); *B66B 17/26* (2013.01); *E21C 47/00* (2013.01)

(58) Field of Classification Search
CPC .................................. B66B 9/06; B66B 17/26
See application file for complete search history.

(56) References Cited

U.S. PATENT DOCUMENTS

| 817,790 A | * | 4/1906 | Marshall | ................. B66B 9/06 |
| | | | | 104/174 |
| 957,379 A | * | 5/1910 | Reubold | ................. B66B 9/06 |
| | | | | 187/245 |

(Continued)

FOREIGN PATENT DOCUMENTS

| DE | 2230556 A1 * | 1/1974 | ............... B66B 9/06 |
| DE | 2321251 A1 * | 11/1974 | ............... B66B 9/06 |

(Continued)

OTHER PUBLICATIONS

German Language International Search Report for International patent application No. PCT/EP2014/001385; dated Aug. 18, 2014.

(Continued)

*Primary Examiner* — Kaitlin S Joerger
(74) *Attorney, Agent, or Firm* — thyssenkrupp North America, Inc.

(57) ABSTRACT

Steep-angle conveying installations may be used to transport raw materials along a slope of an open-cast mining pit, typically from a low-level loading station at a working level of the open-cast mining pit to a high-level unloading station at a ground level. The steep-angle conveying installation may comprise a track arranged on the slope of the open-cast mining pit, as well as one or more conveying cages for moving raw materials along the track between the various levels. Each conveying cage may include an emptying flap that is movable between an open position and a closed position. A thrust carriage may be employed outside the conveying cages to move the emptying flap of the conveying cages between the open and closed positions.

14 Claims, 4 Drawing Sheets

(51) Int. Cl.
  *B66B 9/06* (2006.01)
  *B65G 67/24* (2006.01)
  *E21C 47/00* (2006.01)

(56) References Cited

U.S. PATENT DOCUMENTS

| | | | | |
|---|---|---|---|---|
| 1,415,181 A * | 5/1922 | Lawton | ............. | B66B 17/14 |
| | | | | 414/598 |
| 1,544,998 A * | 7/1925 | Lepley | ............. | B65G 67/00 |
| | | | | 414/650 |
| 1,580,310 A * | 4/1926 | Lepley | ............. | B66B 17/10 |
| | | | | 105/329.1 |
| 1,835,094 A * | 12/1931 | Sayers | ............. | B66B 17/14 |
| | | | | 414/613 |
| 2,161,583 A * | 6/1939 | McClure | ............. | B66B 17/14 |
| | | | | 294/68.26 |
| 2,299,386 A * | 10/1942 | First | ............. | B66B 9/06 |
| | | | | 414/615 |
| 2,479,449 A * | 8/1949 | Woodward | ............. | B66B 17/08 |
| | | | | 414/658 |
| 2,545,170 A * | 3/1951 | Saunders | ............. | B66B 17/08 |
| | | | | 414/646 |
| 2,659,502 A * | 11/1953 | Erickson | ............. | B61D 9/14 |
| | | | | 414/381 |
| 2,700,482 A * | 1/1955 | Erickson | ............. | B61D 9/14 |
| | | | | 105/272 |
| 2,790,569 A * | 4/1957 | Leonard | ............. | B66B 17/08 |
| | | | | 414/616 |
| 2,828,041 A * | 3/1958 | Leonard | ............. | B66B 17/08 |
| | | | | 414/648 |
| 2,969,886 A * | 1/1961 | Lundy | ............. | B66B 17/26 |
| | | | | 414/610 |
| 2,978,123 A * | 4/1961 | Clark | ............. | B65G 3/04 |
| | | | | 414/598 |
| 3,052,367 A * | 9/1962 | Clark | ............. | B66B 17/08 |
| | | | | 414/658 |
| 3,484,008 A * | 12/1969 | Fell | ............. | B66B 17/26 |
| | | | | 414/657 |
| 4,026,388 A * | 5/1977 | Creissels | ............. | B61B 9/00 |
| | | | | 187/245 |
| 4,444,293 A * | 4/1984 | Paul | ............. | B66B 5/20 |
| | | | | 187/369 |
| 4,693,661 A | 9/1987 | Truemper | | |
| 5,122,028 A * | 6/1992 | Joubert | ............. | B66B 17/08 |
| | | | | 414/403 |
| 5,713,715 A * | 2/1998 | Joubert | ............. | B66B 17/26 |
| | | | | 414/609 |
| 6,460,657 B1 | 10/2002 | Isenburg et al. | | |
| 2014/0374220 A1 | 12/2014 | Werre et al. | | |

FOREIGN PATENT DOCUMENTS

| | | | |
|---|---|---|---|
| DE | 199 63 464 A1 | 8/2000 | |
| DE | 10 2012 100 765 A1 | 8/2013 | |
| DE | 102013105946 A1 * | 12/2014 | ............. B66B 9/06 |
| FR | 2506279 A1 * | 11/1982 | ............. B66B 5/20 |
| GB | 1 537 936 A | 1/1979 | |
| JP | S55 140563 U | 10/1980 | |

OTHER PUBLICATIONS

English translation of International Search Report for International patent application No. PCT/EP2014/001385; dated Aug. 18, 2014.
Russian Office Action issued in counterpart application No. RU 2015146918 dated Nov. 14, 2017.

* cited by examiner

STEEP-ANGLE CONVEYING INSTALLATION FOR OPEN-CAST MINING

CROSS REFERENCE TO RELATED APPLICATIONS

This application is a U.S. National Stage Entry of International Patent Application Serial Number PCT/EP2014/001385, filed May 22, 2014, which claims priority to German Patent Application No. DE 102013105937.6 filed Jun. 7, 2013, the entire contents of both of which are incorporated herein by reference.

FIELD

The present disclosure relates to steep-angle conveying installations on slopes of open-cast mining pits.

BACKGROUND

DE 10 2012 100 765 A1 has disclosed a steep-angle conveying installation for arrangement on the slope of an open-cast mining pit, by means of which steep-angle conveying installation raw materials can be transported from a low-level loading station, for example from the working level of the open-cast mine, to a high-level unloading station, which may be situated at ground level.

The conveying cages move on a track with a continuously straight profile which extends between the loading station at the lower end of the steep-angle conveying installation and the unloading station at the upper end of the steep-angle conveying installation. The conveying cages are not tipped for loading and unloading purposes, and the conveying cages have a filling opening on the top side and an emptying flap on the bottom side, and the raw material can be discharged from the conveying cage by opening the emptying flap. For this purpose, the emptying flap is articulatedly fastened to the conveying cage and can be moved between a closed position and an open position.

The load mass of the conveying cages may amount to up to 300 tonnes, and if the emptying flap is situated in the base region of the conveying cages, the load mass of the raw material acts largely on the emptying flap. When the emptying flap is unlocked in order to be opened, the problem arises that the conveying cage is emptied abruptly, and the locking means must be moved counter to the mass forces acting on the emptying flap. This gives rise to structural disadvantages, and the emptying flap and the conveying cages themselves are subject to a high level of wear.

At the unloading station at the upper end of the steep-angle conveying installation, there may be situated a crusher with a corresponding material inlet, and if the raw material is discharged abruptly, disadvantages in the operation of the crusher can arise, as well as disadvantages with regard to possible damage to a bunker above the crusher. A controlled discharge of the conveying cages is thus desirable.

SUMMARY

It is an object of the invention to provide a steep-angle conveying installation which exhibits improved discharging of the conveying cages in the unloading station. It is the object in particular to realize a controlled movement of the emptying flap between the closed position and the open position in order to prevent an abrupt emptying of the raw material out of the conveying cages. In particular, it is the object of the invention to minimize the wear of a closing mechanism of the emptying flap on the conveying cage.

Said object is achieved, proceeding from a steep-angle conveying installation for arrangement on a slope of an open-cast mining pit as per the preamble of claim 1, in conjunction with the characterizing features. Advantageous refinements of the invention are specified in the dependent claims.

According to the invention, a thrust carriage is provided which can be moved against the emptying flap of the conveying cage from an outer side and by means of which the emptying flap can be moved between the closed position and the open position in a controlled manner.

The invention is based on the concept of the emptying flap being guided by a thrust carriage from the outer side of the emptying flap, wherein the thrust carriage can be moved in controlled fashion. Through the controlled movement of the thrust carriage, a controlled movement of the emptying flap is made possible; in particular, by way of the thrust carriage, it is possible for high forces to be applied to the emptying flap, and if the conveying cage is filled with raw materials and a high mass acts on the emptying flap from the inner side, the emptying flap can, despite the force exerted by the raw materials, be moved in controlled fashion by the thrust carriage from the outer side. The thrust carriage can in particular be moved against the emptying flap in the unloading station, and when the conveying cage is situated in the upper parked position in the unloading station, the thrust carriage can be moved against the emptying flap by way of a movement which is independent of the movement of the conveying cage.

In the context of the present invention, a thrust carriage describes any longitudinally or rotationally movable body which is suitable for being moved against the emptying flap from the outer side and exerting a holding and guiding force on said emptying flap. Here, the thrust carriage may roll, slide or be moved in some other way, and may have a cuboidal, elongate, bar-shaped or even circular shape, which, for example in the manner of an eccentric, can be rotated by way of an eccentric surface against the outer side of the emptying flap.

It is particularly advantageously possible for guide means to be provided in which the thrust carriage is movable in order to be moved against the emptying flap. The guide means may have a guide direction for guiding the thrust carriage movement, which guide direction encloses an angle of less than 45°, preferably less than 30°, particularly preferably less than 20° and most preferably less than 10° with the direction of extent of the emptying flap. Here, the guide means may for example be arranged in the track, such that the thrust carriage is received in movable fashion on the track. In the same way, the thrust carriage may be arranged on a supporting structure for holding the track on the slope, wherein the supporting structure forms, for example, the main structure of the steep-angle conveying installation.

By virtue of the thrust carriage being moved counter to the direction of extent of the emptying flap, it is possible, for given movement forces of the thrust carriage, for high contact forces to be exerted on the emptying flap by the thrust carriage. The smaller the angle between the direction of extent of the emptying flap and the guide direction of the thrust carriage, the greater the contact forces that can be exerted on the emptying flap for given movement forces of the thrust carriage.

For example, on the thrust carriage, there may be arranged guide rollers which can roll in the guide means. The guide means may for example form guide slot-like recesses in the track or in the supporting structure of the steep-angle conveying installation, and here, the direction of extent of the guide slot-like guide means determines the direction of movement of the thrust carriage. To introduce the movement into the thrust carriage, movement actuators may be provided; for example, for each thrust carriage, two movement actuators may be arranged between the track or the supporting structure and the thrust carriage. The movement actuators may be formed for example from lifting cylinders or spindle-nut systems. In particular, the track may have two pairs of rails, with the thrust carriage being situated, and moving, between the rails of the pair of rails, and a respective thrust carriage may be provided for each of the two conveying cages, which move on separate pairs of rails.

In a particular refinement of the thrust carriage according to the invention, the latter can be moved against the emptying flap beyond a point of contact with said emptying flap. Here, the conveying cages may have a flap locking means by which the emptying flap can be locked in the closed position, and, when the thrust carriage is moved against the emptying flap beyond the point of contact, the flap locking means can be relieved of load counter to the load of the raw material charge acting on the emptying flap from the inner side. When the thrust carriage has been moved beyond the point of contact with the emptying flap, the thrust carriage substantially completely takes over the load of the raw materials acting on the emptying flap from the inner side. When the flap locking means has been unlocked, the thrust carriage can be slowly retracted, wherein the emptying flap can be opened in controlled fashion as the thrust carriage is retracted.

It is furthermore advantageously possible for the thrust carriage to have at least one contact roller by which said thrust carriage can be moved against the emptying flap. For this purpose, the emptying flap may have at least one raceway against which the contact roller can be moved and on which the contact roller can roll.

The object of the present invention is furthermore achieved by way of a method for actuating an emptying flap on the conveying cages of a steep-angle conveying installation in order to move the emptying flap between a closed position and an open position, wherein the steep-angle conveying installation is designed for arrangement on the slope of an open-cast mining pit, and wherein, by means of the conveying cages, raw materials can be transported from a low-level loading station, in particular from the working level of the open-cast mine, to a high-level unloading station, in particular at ground level. Here, the method provides multiple steps, which encompass at least moving the conveying cage to the high-level unloading station, moving a thrust carriage against the emptying flap, unlocking the emptying flap by way of a flap locking means, and moving the emptying flap by way of a controlled movement of the thrust carriage, while maintaining the contact between the emptying flap and the thrust carriage.

The method may in particular comprise an intermediate step between the moving of the thrust carriage against the emptying flap and the unlocking of the emptying flap by way of a flap locking means. The intermediate step may consist in that the thrust carriage is moved against the emptying flap beyond a point of contact with the latter, such that the flap locking means which closes the emptying flap is at least partially relieved of force. Here, it is however possible for the movement of the thrust carriage by which said thrust carriage is moved against the emptying flap to transition uniformly, and without interruption, into the movement by which the thrust carriage moves beyond the point of contact with the emptying flap, for example in the above-described guide slot of the guide means.

The method may furthermore provide that the thrust carriage is moved by means of at least one movement actuator, wherein the movement actuator, substantially over its entire movement travel, absorbs contact forces in order to control the movement of the emptying flap. For example, it is also possible for the thrust carriage to stop during the opening movement of the emptying flap, whereby the opening movement of the emptying flap is simultaneously stopped. For example, it may also be provided that the thrust carriage is activated, in particular by way of the movement actuators, only when the receiving vessel into which the raw materials are emptied from the conveying cages is ready to receive the raw materials. For example, the steep-angle conveying installation may comprise a crusher in the region of the unloading station, into which crusher the raw materials are unloaded from the conveying cages through the emptying flap. If the bunker of the crusher is still too full, the conveying cage can be moved into the upper parked position in the unloading station without the emptying flap being opened, for as long as the thrust carriage has not yet been activated by way of the movement actuators. Once the crusher or the bunker or some other station for conveying the raw materials onward is ready to receive further raw materials from the conveying cages, the thrust carriage can be moved against the emptying flap by activation of the movement actuators, and the emptying flap can be opened by way of the thrust carriage. This yields the advantage that the unloading process is temporally decoupled from the time at which the upper unloading position is reached. Thus, the unloading position can be arrived at, and at the same time loading can be performed at the loading position, even when unloading is not yet desired.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present invention relates to a steep-angle conveying installation for arrangement on a slope of an open-cast mining pit, by means of which steep-angle conveying installation raw materials can be transported from a low-level loading station, in particular from the working level of the open-cast mine, to a high-level unloading station, in particular at ground level, having a track which is arranged on the slope and on which a first conveying cage and a second conveying cage are movable between the low-level loading station and the high-level unloading station, said conveying cages being designed to receive the raw materials, wherein the conveying cages have an emptying flap for the emptying of the raw materials out of the conveying cages, for which purpose the emptying flap is arranged on the conveying cages so as to be movable between a closed position and an open position.

Figure 1:
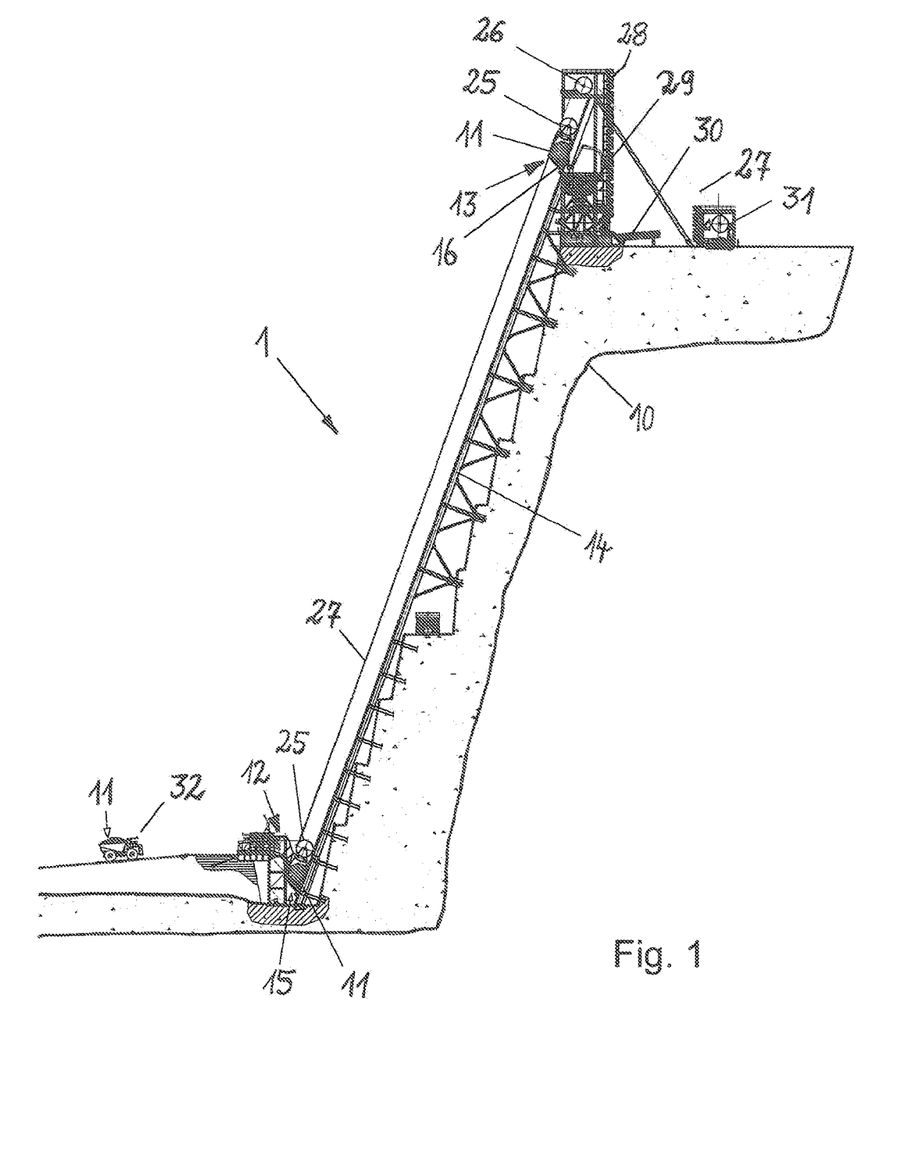
FIG. 1 is a side perspective view of an example steep-angle conveying installation shown in an arrangement on a slope of an open-cast mining pit.

FIG. 1 shows an exemplary embodiment of a steep-angle conveying installation 1 which is arranged on the slope 10 of an open-cast mining pit, and the slope 10 extends from a lower height level to an upper height level, which is for example ground level. In the region of the lower height level, the steep-angle conveying installation 1 has a loading station 12, and in the region of ground level, at the upper height level, the steep-angle conveying installation 1 has an unloading station 13. The raw materials 11, which can be transported to the low-level loading station 12 by vehicles 32, for example, can be conveyed over the height distance between the loading station 12 and the unloading station 13.

For this purpose, the steep-angle conveying installation 1 has a track 14 which extends from the lower height level to above the upper height level, and which runs between the loading station 12 and the unloading station 13. The track 14 is fastened to the oblique slope 10 and, for the extension of the track 14 beyond the upper height level, a supporting structure 28 is provided to which the track 14 is fastened so as to run in continuous fashion.

The steep-angle conveying installation 1 has a first conveying cage 15 and a second conveying cage 16. Here, in the context of the present invention, the expression "conveying cage" 15, 16 encompasses any form of vessels suitable for receiving raw materials 11, and the vessels may be formed from steel plates, from a composite material, for example ferroconcrete, from a welded steel structure or the like, and are not restricted in terms of its construction to a cage-like body in the narrower sense.

The first conveying cage 15 is shown, by way of example, in a parked position in the loading station 12, and the second conveying cage 16 is shown, by way of example, in a parked position in the unloading station 13. The conveying cages 15 and 16 are connected to one another by way of a traction mechanism 27 which is guided over upper diverting rollers 26 and lower diverting rollers 25. The conveying cages 15 and 16 are driven by a drive unit 31, wherein the conveying cages 15 and 16 can be moved back and forth in shuttle operation between the lower loading station 12 and the upper unloading station 13. In this way, the inherent weight of the conveying cages 15 and 16 is cancelled out, such that this does not have to be conveyed by way of the drive unit 31. The drive unit 31 is illustrated as being free-standing on the ground at a distance from the upper supporting structure 28 of the steep-angle conveying installation 1.

For example, while the first conveying cage 15 is being loaded with raw material 11, the second conveying cage 16, which is situated at the top, can be unloaded into a crusher 29 which is incorporated, as a structural unit with the steep-angle conveying installation 1, in the supporting structure 28. The crusher 29 can serve for comminuting the raw material 11, which is subsequently supplied for further use via a discharge conveyor belt 30.

When the first conveying cage 15 illustrated in the loading station 12 has been loaded, and the second conveying cage 16 in the unloading station 13 has been unloaded into the crusher 29, the drive unit 31 can be set in operation, and the first conveying cage 15, in a loaded state, travels upward along the track 14 to the unloading station 13, whereas the second conveying cage 16, in an unloaded state, travels downward from the unloading station 13 to the loading station 12. The loading and unloading process of the conveying cages 15 and 16 can subsequently be repeated. Consequently, the steep-angle conveying installation 1 operates periodically with shuttle operation of the two conveying cages 15 and 16.

Pulley tackles may be formed between the lower and upper diverting rollers 25 and 26, in a manner not shown in any more detail, by virtue of the traction mechanism 27 being guided between the diverting rollers 25 and 26 multiple times. The supporting structure 28 may be composed of a steel structure, and the track 14 may for example be formed from two support rails, or, for both conveying cages 15 and 16, from four support rails.

Figure 2:
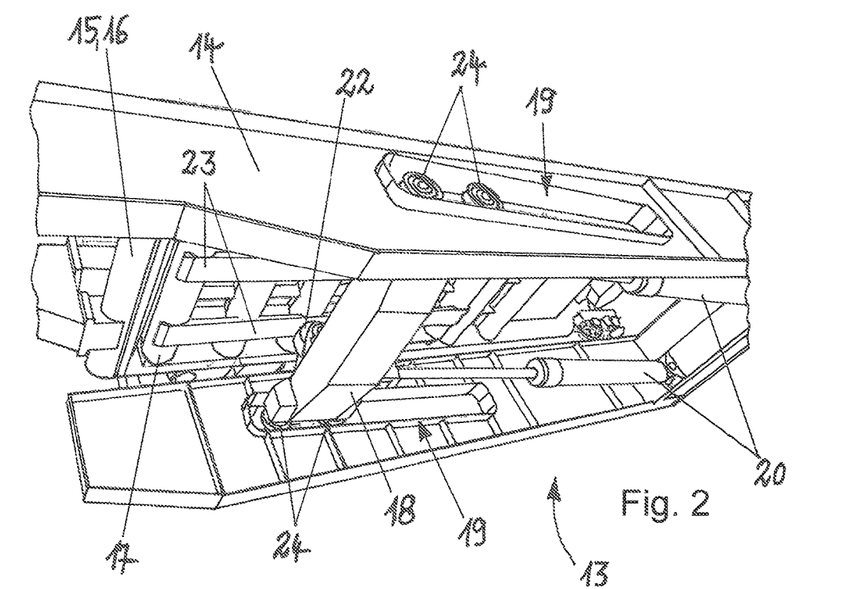
FIG. 2 is a perspective view of an example thrust carriage in a region of an unloading station, wherein an example emptying flap of an example conveying cage is closed.
Figure 3:
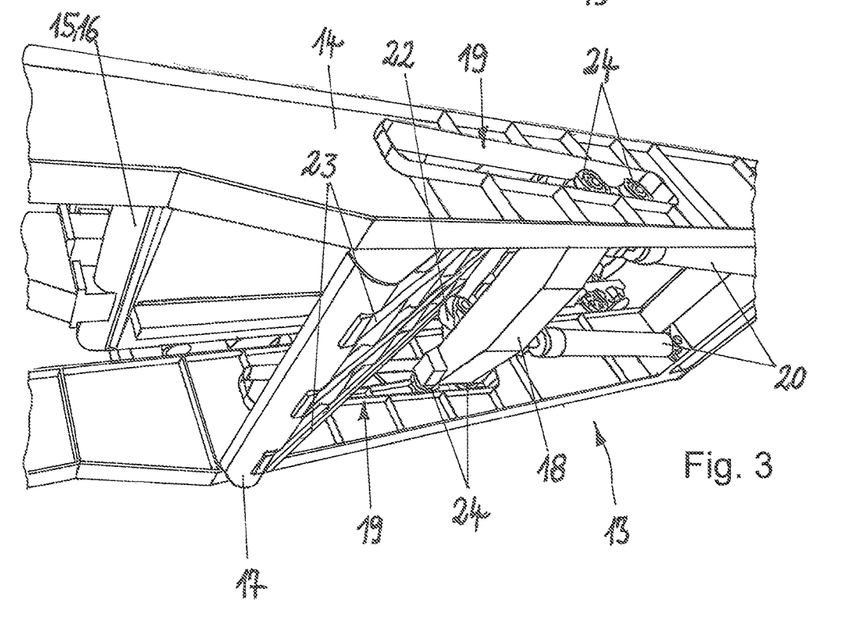
FIG. 3 is a perspective view of the example thrust carriage of FIG. 2 as the example emptying flap performs an opening movement.

FIGS. 2 and 3 each show a detail view of the steep-angle conveying installation in the region of the unloading station 13, and a conveying cage 15, 16 is shown, from the underside, in a partial view, wherein the emptying flap 17 is situated on the underside of the conveying cage 15, 16, which emptying flap is illustrated closed in FIG. 2 and partially open in FIG. 3. The conveying cage 15, 16 can, in a manner not shown in any more detail, move on a track 14 which is formed for example from two rail bodies running in parallel.

At the height at which the conveying cage 15, 16 assumes its parked position in the unloading station 13, there is situated a thrust carriage 18 which can be moved in a guide means 19. For this purpose, the thrust carriage 18 has guide rollers 24 which can roll in the guide slot-like guide means 19. Here, the guide means 19 is, by way of example, formed into the rail bodies of the track 14.

The emptying flap 17 is articulatedly arranged on the base side of the conveying cage 15, 16, and when the emptying flap is opened, as shown by way of example in FIG. 3, raw materials contained in the conveying cage 15, 16 can be emptied from the latter.

FIG. 2 shows the thrust carriage 18 in a position in which contact rollers 22 attached to the thrust carriage 18 are in contact with the emptying flap 17. For the contact of the contact rollers 22 against the emptying flap 17, the emptying flap 17 has raceways 23 on which the contact rollers 22 of the thrust carriage 18 can roll. For the movement of the thrust carriage 18, movement actuators 20 in the form of lifting cylinders are shown, such that, by retraction and deployment of the movement actuators 20, the thrust carriage 18 can be moved between a forward end position and a rearward end position, wherein the thrust carriage 18 is shown approximately in the forward end position.

In the forward position shown, the contact rollers 22 just make contact with the raceways 23 on the emptying flap 17. If the thrust carriage 18 is moved onward in the direction of a forward end position in the guide means 19 by further deployment of the movement actuators 20, the load acting on the emptying flap 17 from the inner side can be absorbed by the thrust carriage 18. In the unloaded arrangement of the locking means of the emptying flap 17, said locking means can be released, such that, when the thrust carriage 18 is retracted, as shown in FIG. 3, the emptying flap 17 can be opened in controlled fashion.

FIG. 3 shows the thrust carriage 18 in contact with the emptying flap 17 in a rearward position, in which the movement actuators 20 are substantially retracted. In this case, the contact rollers 22 have rolled on the raceways 23, and as a result of the retraction of the thrust carriage 18 with the guide rollers 24 in the guide means 19, the emptying flap 17 can be opened in controlled fashion, that is to say the opening movement can for example also be stopped. Here, the raw material can fall out of the conveying cage 15, 16 and through between the guide rails of the track 14, and can pass for example into the bunker of a crusher in the region of the unloading station 13 of the steep-angle conveying installation 1. The relief of load of the locking mechanism of the emptying flap 17 and the subsequent opening of the emptying flap 17 are shown in a sequence in the following FIGS. 4 to 7. In the same way, the raw material 11 can also be unloaded into a conveying cage of a subsequent further steep-angle conveying installation, if multiple steep-angle conveying installations 1 are arranged in cascaded fashion on the slope of an open-cast mining pit.

FIGS. 4 to 7 show a conveying cage 15, 16 on a track 14 in a region in which the conveying cage 15, 16 travels over a schematically illustrated thrust carriage 18, for example in the high-level unloading station 13 of the steep-angle conveying installation 1.

The thrust carriage 18 is guided in a guide means 19 which has a direction of extent which encloses an angle with the direction of extent of the emptying flap 17. As a result of the movement of the thrust carriage 18 in the guide means 19, the thrust carriage 18 can be moved against the emptying flap 17 at the outside. The emptying flap 17 can be closed by way of a flap locking means 21 which is pivotably mounted on the conveying cage 15, 16, wherein the flap locking means 21 is coupled to a locking means control element 33. If the locking means control element 33 is moved longitudinally, the flap locking means 21 pivots such that the emptying flap 17 can be released. When the flap 17 opens, the raw material 11 can be emptied from the opening region of the conveying cage 15, 16. The method for the actuation of the emptying flap 17 on the conveying cage 15, 16 by means of the thrust carriage 18 will be described below.

Figures 4, 5:
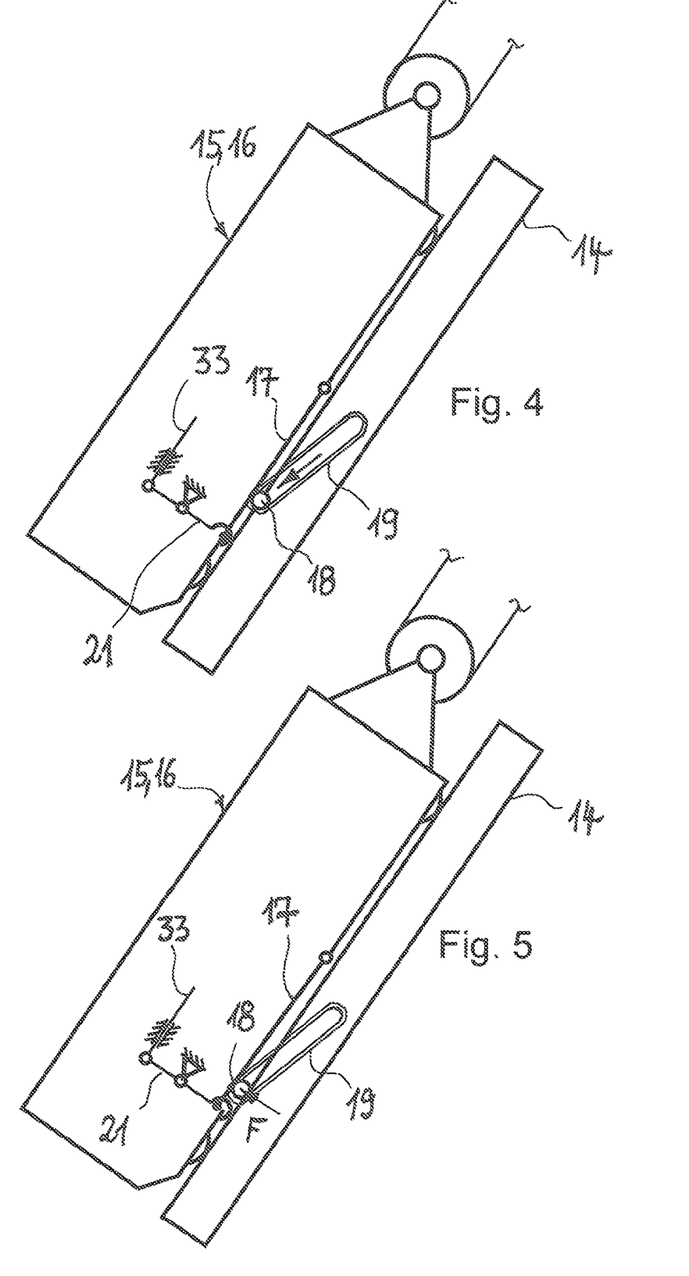
FIG. 4 is a schematic view of an example conveying cage on a track, with an example thrust carriage having been moved against an emptying flap of the conveying cage.
FIG. 5 is a schematic view of the example conveying cage of FIG. 4, with the thrust carriage having been moved against the emptying flap beyond a point of contact with the emptying flap.

In FIG. 4, the thrust carriage 18 is initially merely in contact with the emptying flap 17, and the thrust carriage 18 has been moved into the forward region of the guide means 19. In this case, the emptying flap 17 is still loaded into the illustrated claw of the flap locking means 21, as in the contact position of the thrust carriage 18 against the emptying flap 17, it is not yet possible for a force to be absorbed by the thrust carriage 18.

FIG. 5 shows the thrust carriage 18 in contact with the emptying flap 17, wherein the thrust carriage 18 has been moved a small distance beyond a point of contact with the emptying flap 17, such that a contact force F is exerted by the thrust carriage 18 against the emptying flap 17. As a result, the front region of the emptying flap 17 is released from the claw of the flap locking means 21, such that the flap locking means 21 is at least partially relieved of force.

Figure 6:
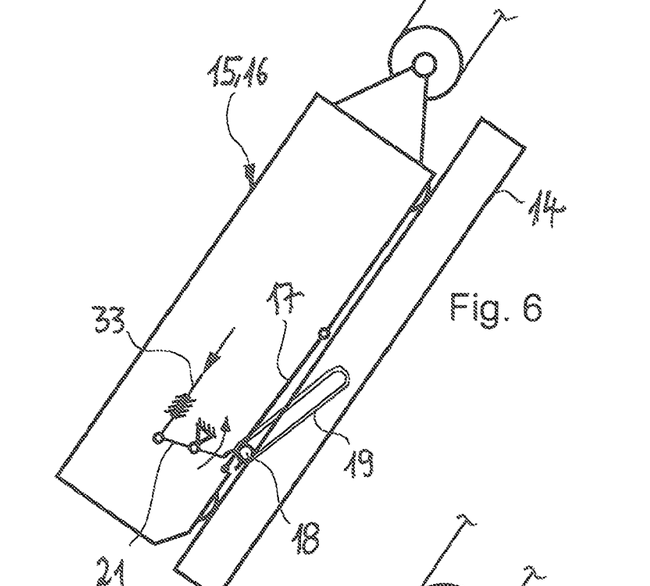
FIG. 6 is a schematic view of an example conveying cage on a track, with an example flap locking mechanism having unlocked an emptying flap.

FIG. 6 shows the arrangement of the thrust carriage 18 as per the arrangement in FIG. 5, in which the thrust carriage 18 has been moved against the emptying flap 17 beyond the point of contact therewith. Subsequently, the locking means control element 33 has been activated, such that the flap locking means 21 has been pivoted in the illustrated arrow direction such that the claw of the flap locking means 21 has disengaged from the emptying flap 17. In the illustrated arrangement as per FIG. 6, the weight of the raw material 11 acting on the emptying flap 17 from the inner side of the conveying cage 15, 16 exerts load on the thrust carriage 18.

Figure 7:
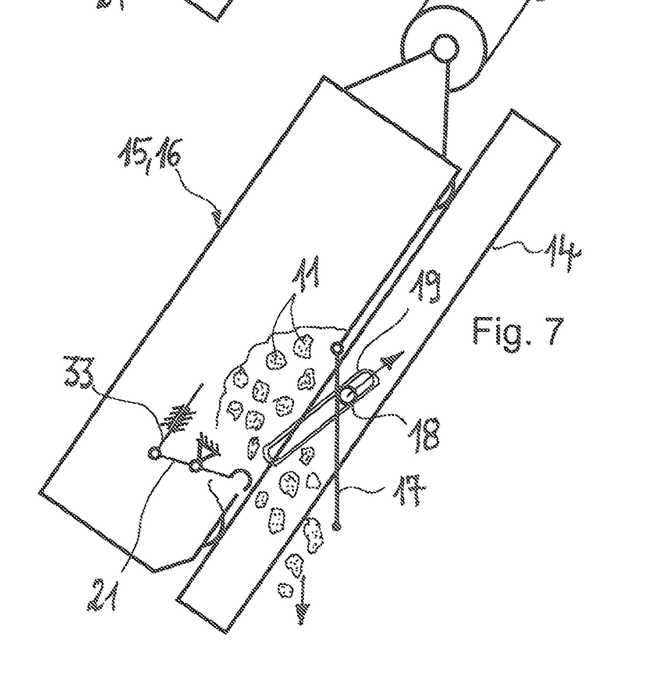
FIG. 7 is a schematic view of an example conveying cage on the track, with an example emptying flap having been opened by a retracted thrust carriage such that raw materials can be unloaded from the conveying cage.

FIG. 7 shows a movement of the thrust carriage 18 from the closed position of the emptying flap 17 into a position in which the emptying flap 17 is moved into an open position. The opening of the emptying flap 17 is achieved by virtue of the thrust carriage 18 being retracted in the guide means 19, wherein the retraction can be performed in controlled fashion such that the emptying of the raw material 11 from the conveying cage 15, 16 can be performed in a slow and controlled fashion. When the conveying cage 15, 16 has been fully emptied, the thrust carriage 18 can be moved back again into the position shown in FIG. 6, and the locking means control element 33 can likewise be moved back again counter to the arrow direction shown in FIG. 6, such that the flap locking means 21 can also be pivoted back again counter to the illustrated arrow direction in order to re-engage with the emptying flap 17. Subsequently, the thrust carriage 18 can be moved within the guide means 19 into the retracted position shown in FIG. 7 again, and the conveying cage 15, 16 can leave the emptying station 13 in an empty state, with the emptying flap 17 held in the closed position again by the flap locking means 21.

The relief of load of the flap locking means 21, as generated by the contact force F of the thrust carriage 18 on the emptying flap 17, can be at least partially realized as long as at least the locking means control element 33 can disengage the flap locking means 21 from the emptying flap 17 without increased wear. For example, the locking means control element 33 may firstly preload the flap locking means 21, with it only subsequently being possible for the thrust carriage 18 to be moved beyond the point of contact with the emptying flap 17, such that, when a minimum contact force F is attained, the locking means control element 33 opens the flap locking means 21 and disengages the latter from the emptying flap 17. Subsequently, the thrust carriage 18 can be retracted in controlled fashion such that the raw material 11 can be emptied out of the conveying cage 15, 16 in controlled fashion.

The invention is not restricted in terms of its embodiment to the preferred exemplary embodiment specified above. Rather, numerous variants are conceivable which make use of the illustrated solution even in fundamentally different embodiments. All of the features and/or advantages that emerge from the claims, from the description or from the drawings, including structural details or spatial arrangements, may be essential to the invention both individually and in a wide variety of combinations.

What is claimed is:

1. A steep-angle conveying installation for transporting raw materials along a slope of an open-cast mining pit from a low-level loading station at a working level of the open-cast mining pit to a high-level unloading station at a ground level, the steep-angle conveying installation comprising:

a track arranged on the slope of the open-cast mining pit;

a first conveying cage and a second conveying cage movable along the track between the low-level loading station and the high-level unloading station, the first and second conveying cages configured to receive raw materials, the first and second conveying cages each having an emptying flap articulatedly disposed on a base side of the conveying cages to permit emptying of the raw materials from the first and second conveying cages, the emptying flap being articulatedly movable between an open position and a closed position; and a thrust carriage for moving the emptying flap between the open position and the closed position, the thrust carriage positionable against the emptying flap from an outside of the first and second conveying cages by way of a movement that is independent of the movement of the first and second conveying cages.

2. The steep-angle conveying installation of claim 1 further comprising a guide track along which the thrust carriage is movable.

3. The steep-angle conveying installation of claim 2 wherein the guide track is oriented at an angle of less than 45 degrees with respect to the emptying flap in the closed position.

4. The steep-angle conveying installation of claim 2 wherein the guide track is oriented at an angle of less than 10 degrees with respect to the emptying flap in the closed position.

5. The steep-angle conveying installation of claim 2 wherein the guide track is arranged in and movable along the track on the slope of the open-cast mining pit.

6. The steep-angle conveying installation of claim 2 wherein the guide track is formed by at least one guide slot formed in the track arranged on the slope of the open-cast mining pit, wherein guide rollers of the thrust carriage roll along the at least one guide slot.

7. The steep-angle conveying installation of claim 1 further comprising at least one movement actuator for sliding the thrust carriage.

8. The steep-angle conveying installation of claim 1 wherein the thrust carriage is movable against the emptying flap and beyond a point of contact with the emptying flap.

9. The steep-angle conveying installation of claim 8 wherein the first and second conveying cages comprise a flap lock for locking the emptying flap in the closed position, wherein a force on the flap lock is relieved when the thrust carriage is moved beyond the point of contact with the emptying flap.

10. The steep-angle conveying installation of claim 1 wherein the thrust carriage includes at least one contact roller, wherein the emptying flap includes at least one raceway, wherein the at least one contact roller rolls along and contacts the raceway of the emptying flap.

11. A method of actuating an emptying flap articulatedly disposed on a base side of conveying cages of a steep-angle conveying installation for use along a slope of an open-cast mining pit, wherein the emptying flap is articulatedly movable between an open position and a closed position, wherein the conveying cages are for transporting raw materials from a low-level loading station at a working level of the open-cast mining pit to a high-level unloading station at a ground level, the method comprising:

moving a conveying cage to the high-level unloading station;

moving a thrust carriage against an outer side of the emptying flap;

unlocking the emptying flap by way of a flap lock; and articulatedly moving the emptying flap by way of a controlled longitudinal movement of the thrust carriage while maintaining contact between the emptying flap and the thrust carriage, wherein the movement of the thrust carriage is independent of the movement of the conveying cage.

12. The method of claim 11 further comprising moving the thrust carriage beyond a point of contact with the emptying flap such that a flap lock that closes the emptying flap is at least partially relieved of a force.

13. The method of claim 11 further comprising using at least one movement actuator to control movement of the thrust carriage.

14. The method of claim 13 wherein the at least one movement actuator controls a rate at which the emptying flap is opened.

* * * * *